United States Patent
Keesara et al.

(10) Patent No.: US 9,832,124 B2
(45) Date of Patent: *Nov. 28, 2017

(54) METHOD AND APPARATUS PROVIDING SINGLE-TIER ROUTING IN A SHORTEST PATH BRIDGING (SPB) NETWORK

(71) Applicant: Extreme Networks, Inc., San Jose, CA (US)

(72) Inventors: Srikanth Keesara, Tewksbury, MA (US); Roger Lapuh, Uesslingen (CH)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,910

(22) Filed: Aug. 31, 2016

(65) Prior Publication Data

US 2016/0373357 A1 Dec. 22, 2016

Related U.S. Application Data

(63) Continuation of application No. 14/068,514, filed on Oct. 31, 2013, now Pat. No. 9,467,366.

(Continued)

(51) Int. Cl.
*H04L 12/743* (2013.01)
*H04L 12/721* (2013.01)
(Continued)

(52) U.S. Cl.
CPC .......... *H04L 45/7457* (2013.01); *H04L 45/12* (2013.01); *H04L 45/44* (2013.01);
(Continued)

(58) Field of Classification Search
None
See application file for complete search history.

(56) References Cited

U.S. PATENT DOCUMENTS 7,822,027 B2    10/2010 Yadav et al.
8,705,353 B1 *   4/2014 Reddy ................ H04L 41/0806
                                                370/230

(Continued)

FOREIGN PATENT DOCUMENTS

WO    2013154813 A1    10/2013

OTHER PUBLICATIONS

Search Report under Section 17(5); Application No. GB1322543.8; dated Jun. 12, 2014; Intellectual Property Office; South Wales, QQ, UK.

(Continued)

*Primary Examiner* — Chi H Pham
*Assistant Examiner* — Vladislav Agureyev
(74) *Attorney, Agent, or Firm* — Haley Guiliano LLP

(57) ABSTRACT

A method, apparatus and computer program product for providing Virtual Routing and Forwarding (VRF) and gateway Media Access Controller (MAC) distribution is presented. At least one subnet associated with a Layer 2 Virtual Switching Network (L2VSN) is provided on a network device. A message is propagated to a distributed Datapath. Network devices install the message as a routable MAC address on the L2VSN for the Layer 3 Virtual Switching Network/Virtual Routing and Forwarding (L3VSN/VRF) associated with the message. Edge devices route packets on the L2VSN addressed to the gateway MAC address.

16 Claims, 15 Drawing Sheets

Related U.S. Application Data

(60) Provisional application No. 61/842,420, filed on Jul. 3, 2013.

(51) Int. Cl.
  *H04L 12/931* (2013.01)
  *H04L 29/12* (2006.01)

(52) U.S. Cl.
  CPC .............. *H04L 45/66* (2013.01); *H04L 49/70* (2013.01); *H04L 61/103* (2013.01)

(56) References Cited

U.S. PATENT DOCUMENTS

| | | | |
|---|---|---|---|
| 8,792,501 B1* | 7/2014 | Rustagi | ................... H04L 45/58 370/217 |
| 9,055,000 B1* | 6/2015 | Ghosh | ..................... H04L 45/66 |
| 9,497,039 B2* | 11/2016 | Greenberg | .......... H04L 12/4633 |
| 9,525,624 B2 | 12/2016 | Keesara et al. | |
| 2004/0162915 A1 | 8/2004 | Caronni et al. | |
| 2009/0031201 A1 | 1/2009 | Das et al. | |
| 2011/0317559 A1 | 12/2011 | Kern et al. | |
| 2011/0317703 A1 | 12/2011 | Dunbar et al. | |
| 2012/0014387 A1 | 1/2012 | Dunbar et al. | |
| 2013/0044636 A1 | 2/2013 | Koponen et al. | |
| 2013/0060940 A1 | 3/2013 | Koponen et al. | |
| 2013/0100851 A1 | 4/2013 | Bacthu et al. | |
| 2013/0125112 A1 | 5/2013 | Mittal et al. | |
| 2013/0223440 A1 | 8/2013 | DeCusatis et al. | |
| 2013/0259465 A1 | 10/2013 | Blair | |
| 2013/0322443 A1 | 12/2013 | Dunbar et al. | |
| 2014/0059192 A1 | 2/2014 | Miklos | |
| 2014/0086252 A1 | 3/2014 | Keesara et al. | |
| 2014/0098815 A1* | 4/2014 | Mishra | ................... H04L 45/021 370/390 |
| 2014/0195666 A1* | 7/2014 | Dumitriu | ............ H04L 12/4625 709/223 |
| 2014/0369184 A1 | 12/2014 | Keesara et al. | |
| 2014/0372582 A1* | 12/2014 | Ghanwani | ............... H04L 45/64 709/223 |
| 2015/0009993 A1 | 1/2015 | Keesara et al. | |
| 2015/0009994 A1 | 1/2015 | Keesara et al. | |

OTHER PUBLICATIONS

Search Report under Section 17(5); Application No. GB1322540.4; dated Jun. 12, 2014; Intellectual Property Office; South Wales, QQ, UK.

Agureyev, Vladislav Y; Office Action; U.S. Appl. No. 14/068,514; dated Aug. 25, 2015; U. S. Patent and Trademark Office, Alexandria, Virginia.

Rivas, Raul; Office Action; U.S. Appl. No. 14/068,337; dated Jul. 16, 2015; U.S Patent and Trademark Office, Alexandria, Virginia.

Agureyev, Vladislav Y; Notice of Allowance; U.S. Appl. No. 14/068,514; dated Jun. 2, 2016; U. S. Patent and Trademark Office, Alexandria, Virginia.

Agureyev, Vladislav Y; Notice of Allowance; U.S. Appl. No. 14/068,514; dated Mar. 14, 2016; U. S. Patent and Trademark Office, Alexandria, Virginia.

Rivas, Raul; Notice of Allowance; U.S. Appl. No. 14/068,337; dated Feb. 9, 2016; U.S. Patent and Trademark Office, Alexandria, Virginia.

* cited by examiner

METHOD AND APPARATUS PROVIDING SINGLE-TIER ROUTING IN A SHORTEST PATH BRIDGING (SPB) NETWORK

CROSS-REFERENCE TO RELATED APPLICATIONS

This application is a continuation of U.S. patent application Ser. No. 14/068,514, filed on Oct. 31, 2013, which claims the benefit of U.S. Provisional Patent Application No. 61/842,420, filed on Jul. 3, 2013, and which is related to co-pending U.S. patent application Ser. No. 14/068,337, filed on Oct. 31, 2013, all of which are hereby incorporated by reference in their entirety.

BACKGROUND

In a computer network, network switching devices (switches) interconnect to form a path for transmitting information between an originator and a recipient. A routing mechanism, or protocol, defines switching logic that forwards the transmitted information in the form of packets between the switches as a series of "hops" along a path. At each switch, the switching logic identifies the next switch, or hop, in the path using an identifier such as a Media Access Control (MAC) address. Shortest Path Bridging (SPB) is a routing mechanism having switching logic such that each switch advertises the nodes, and the link topology between the nodes, it knows about to all the other switches, and eventually all the switches in the network have the same topology picture of the network and therefore can forward frames to the next hop along a shortest path.

In a conventional router or switch, the fast packet forwarding (datapath) and the high level routing decisions (control path) occur on the same device. An OpenFlow Switch separates these two functions. The datapath portion still resides on the switch, while high-level routing decisions are moved to a separate controller, typically a standard server. The OpenFlow Switch and Controller communicate via the OpenFlow protocol, which defines messages, such as packet-received, send-packet-out, modify-forwarding-table, and get-stats.

The datapath of an OpenFlow Switch presents a clean flow table abstraction; each flow table entry contains a set of packet fields to match, and an action (such as send-out-port, modify-field, or drop). When an OpenFlow Switch receives a packet it has never seen before, for which it has no matching flow entries, it sends this packet to the controller. The controller then makes a decision on how to handle this packet. It can drop the packet, or it can add a flow entry directing the switch on how to forward similar packets in the future.

In simpler terms, OpenFlow allows the path of network packets through the network of switches to be determined by software running on multiple routers (minimum two of them—primary and secondary—has a role of observers). This separation of the control from the forwarding allows for more sophisticated traffic management than is feasible using access control lists (ACLs) and routing protocols.

Several vendors have announced plans to offer Software Defined Network (SDN) controllers. These controllers may use overlay methods where software based switches and routers build tunnels to cross a more traditional IP network layer and OpenFlow based hardware proposals where the Tertiary Content Addressable Memory (TCAM) supported lookups are used to achieve custom L2-L7 forwarding rules that get pushed down from a controller using open stack.

SUMMARY

Conventional mechanisms such as those explained above suffer from a variety of deficiencies. One such deficiency with overlay methods is that they are ignorant of the underlying physical network topology and tend be inefficient in how they handle multicast as well as how much of an encapsulation overhead is required to support the overlay tunnels. They can also end up requiring expensive hardware gateways to connect to users outside the data center. A deficiency with TCAM supported lookups are that TCAMs are one of the most expensive and power hungry components of networking hardware and achieving large TCAM sizes at highest port densities of current and future Ethernet switches is either an impractical or a very expensive proposition The traditional 3-tier and more recently the 2-tier architectures used in enterprise and datacenter networks are under pressure. Part of the reason for this is that server and host placement within a data center is very dynamic and a subnet could acquire presence at any point around the perimeter of really large data networks. This behavior is different from the traditional model where hosts within a subnet were placed close to a single aggregation cluster. When deployed in combination traditional routing architectures, this leads to very inefficient traffic patterns wasting network bandwidth as a result.

The presently described invention proposes mechanisms that achieve a single tier routing architecture as a way of solving this problem. A Layer 3 (L3) controller uses standard SPB encapsulation as fabric headers to provide centralized control for a distributed datapath.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Santa Clara, Calif.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
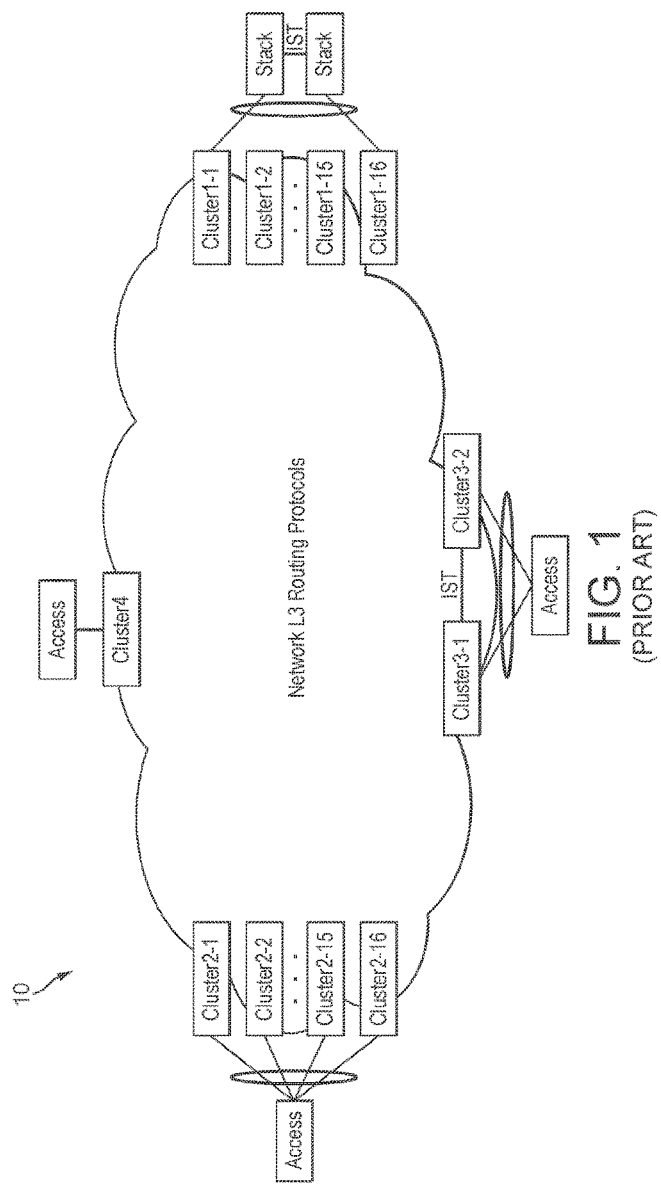
FIG. 1 depicts a network having redundant access.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The presence of subnets is spreading around networks. A subnet is a logical grouping of connected network devices. Nodes on a subnet tend to be located in close physical proximity to each other on a Local Area Network (LAN). Network designers employ subnets as a way to partition networks into logical segments for greater ease of administration. When subnets are properly implemented, both the performance and security of networks can be improved.

Formerly, subnets were predominately localized within specific distribution clusters, now more generally throughout the network, which places additional computing pressure on the network gateways of the subnets. This is shown in FIG. 1 through FIG. 3.

Referring now to FIG. 1, a traditional network environment 10 including a transport network and associated edge devices are shown. Devices labeled cluster 3-1 and cluster 3-2 are arranged in a conventional Split MultiLink Trunk (SMLT) arrangement wherein an intra-cluster link (IST) is used to send messages between the two devices. The device labeled cluster 4 is a stand-alone device and operates in conventional ways. Devices labeled Cluster 1-1 through cluster 1-16 are multi-homed to form a User Network Interface (UNI) Link Access Group (LAG). Devices labeled Cluster 2-1 through cluster 2-16 are also multi-homed to form a UNI LAG in accordance with the present invention.

Figure 2:
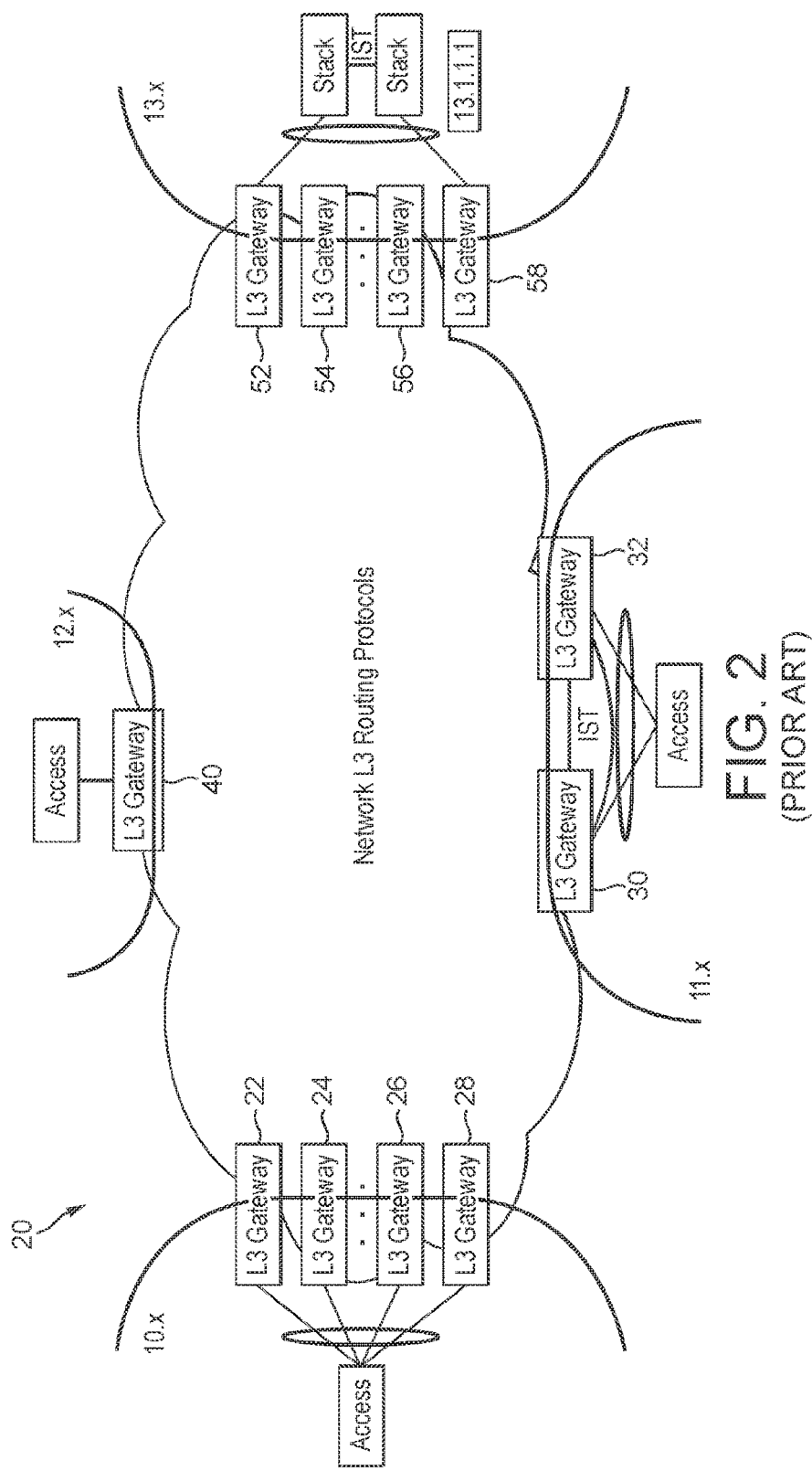
FIG. 2 depicts a traditional networking view including Layer 3 (L3) services.

Referring now to FIG. 2, a traditional networking view 20 of L3 services is shown. Shown are four subnets (10.x, 11.x, 12.x and 13.x). Subnet 10.x include a UNI LAG having multiple gateways 22, 24, 25 and 28. Subnet 11.x includes a conventional Split MultiLink Trunk (SMLT) arrangement wherein an intra-cluster link (IST) is used to send messages between the two devices 30 and 32. Subnet 12.x includes a standalone device 40, and subnet 13.x includes also include a UNI LAG having multiple gateways 52, 54, 56 and 58. The subnets are clustered along the cluster boundaries.

Figure 3:
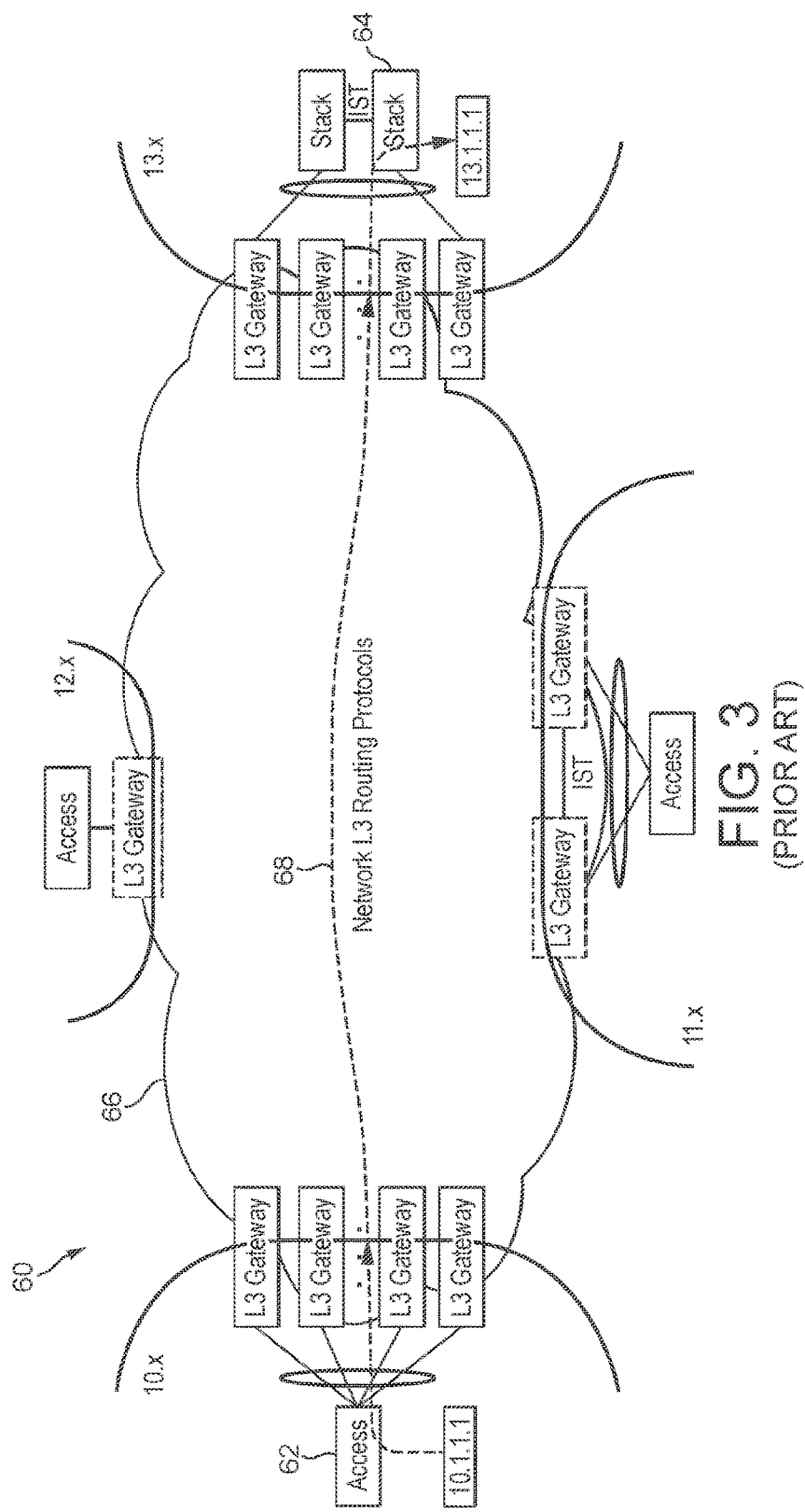
FIG. 3 depicts a traditional networking view including L3 packet flow.

Referring to FIG. 3, in network environment 60 the packet flow from device 62 having an address of 10.1.1.1 makes a single pass through the core network 66 to device 64 having an address of 13.1.1.1. This tends to be very efficient.

The location and placement of the gateways determine how efficient the routing patterns are when traffic goes from a first subnet to a second subnet within a network. The host can spread data around the network to localize the functions. When a host moves from one location to another location, this can result in inefficient routing patterns.

Figure 4:
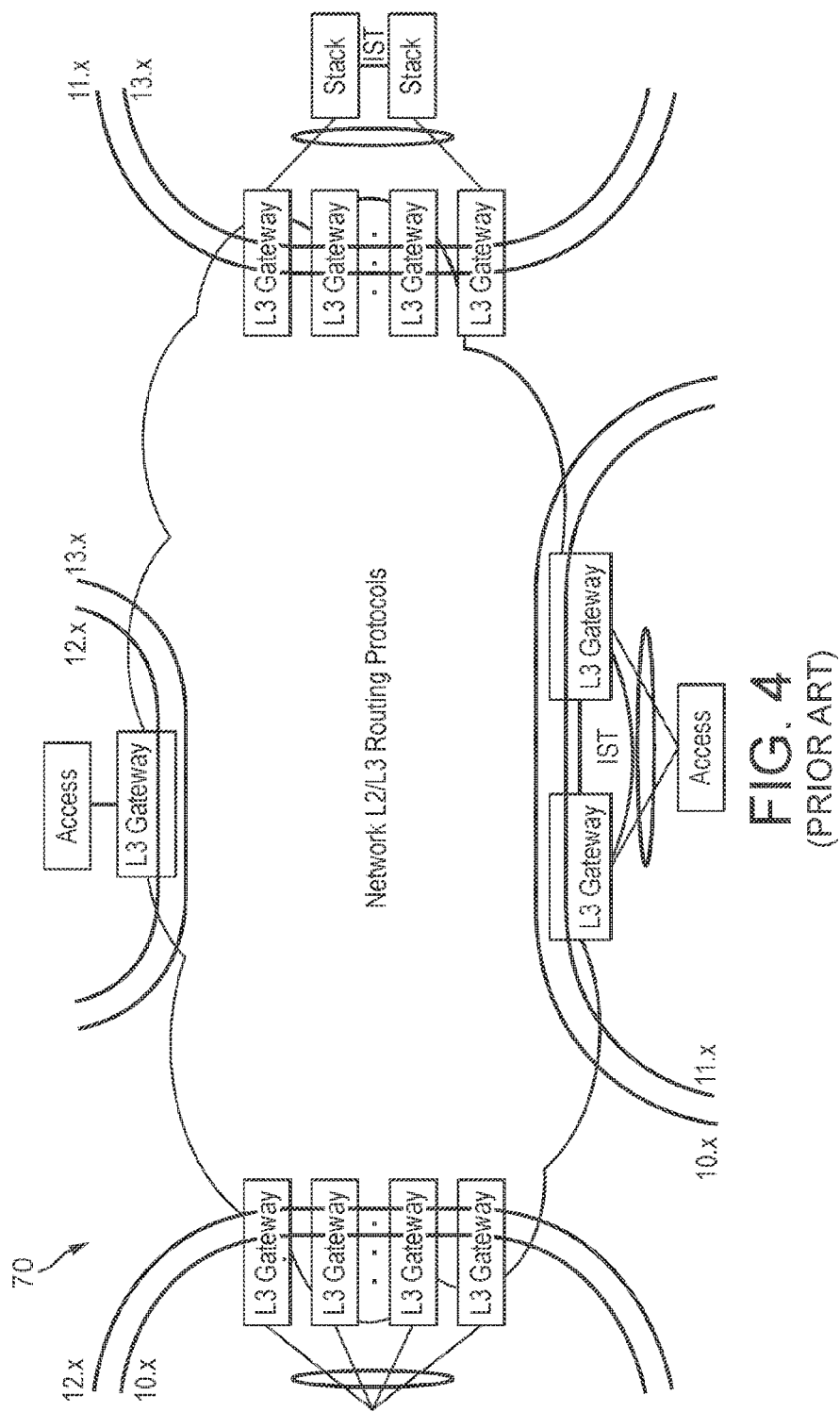
FIG. 4 depicts a traditional networking view including server virtualization.

Referring now to FIG. 4, in network environment 70 the affinity of a single subnet to a single cluster is disappearing. The hosts of a subnet may migrate to a different cluster. In this figure, each of the subnets is now presenting two different clusters. The gateways are still traditionally provisioned.

Figure 5:
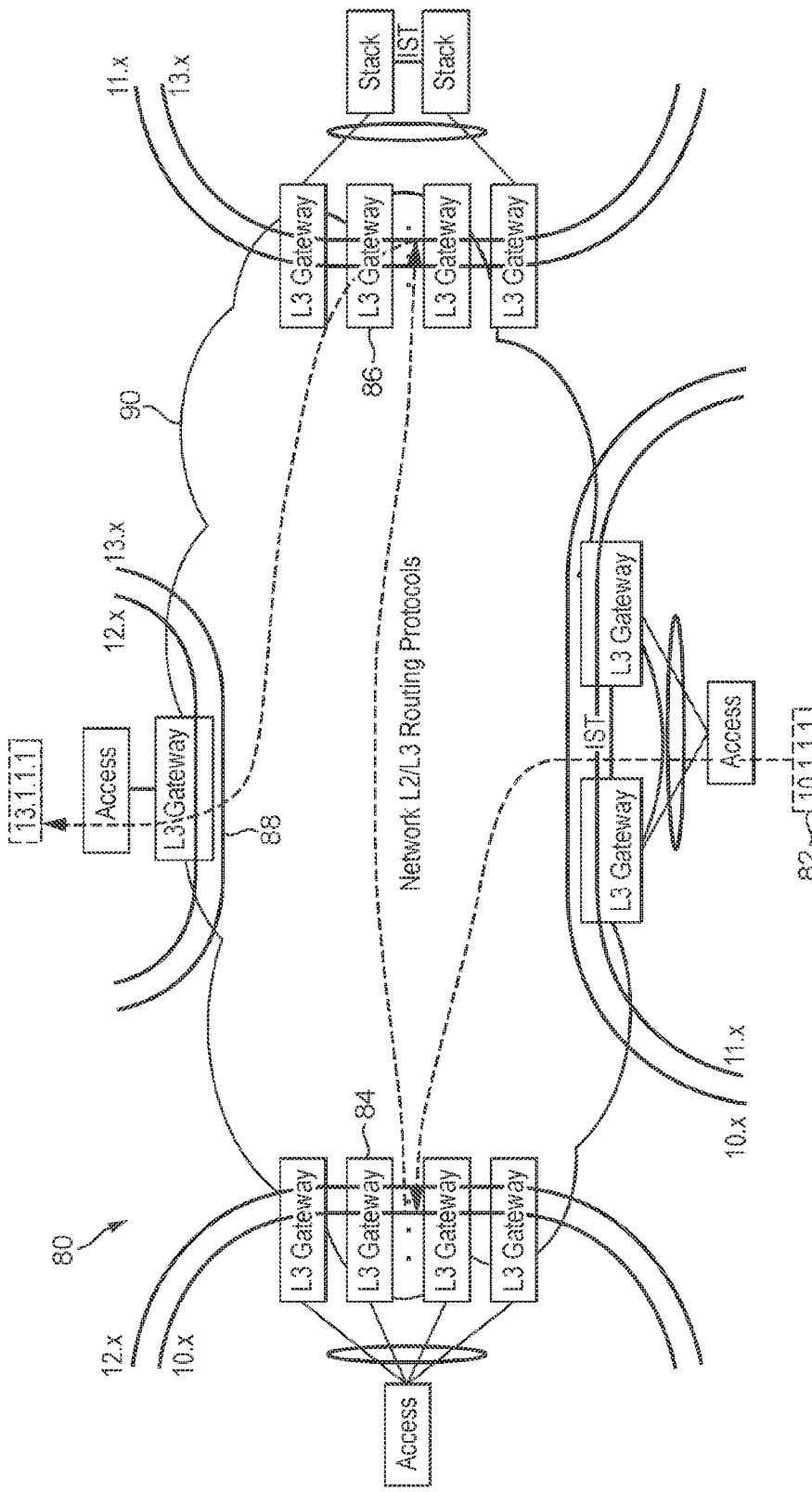
FIG. 5 depicts a traditional networking view including L3 packet flow after V-Motion.

Potentially the core network could have to be traversed multiple times to transmit a packet from a first gateway to a second gateway. Referring now to FIG. 5, packet flow from 10.1.1.1 to 13.1.1.1 occurs like this. Host 10.1.1.1 sends the packet across the core network to its default gateway on the left most cluster. The packet now gets sent across the core network to the right most cluster, and from there across the core to the top most cluster, to device 13.1.1.1. In this scenario, three passes across the core network are required. This wastes network bandwidth.

By way of the presently disclosed method and apparatus for providing single-tier routing in a network, the routing function is moved to the perimeter of the network and a presence of a gateway routing function at the perimeter of the network, as opposed to the routing function being localized to one cluster. Also, this needs to be done wherein the control and administration of the network does not require configuration of L3 routing all around the network which complicates network administration.

The forwarding function is pushed and distributed around the network routing function, while collapsing the control functions of resolving host address, host locations, etc. ARP and external gateway protocol interactions are centralized to ARP routers within the network.

One key aspect is letting the perimeter of the network know what the routing domain associations are, which is typically a VRF association and a gateway MAC address for each subnet. This is accomplished by using a new message that is sent from a centralized controller or a centralized router to the datapath indicating that for each subnet this is the gateway and VRF association. This is done by using an L2 VSN ID, an L3 VSN ID, and a gateway MAC address message.

The L2 VSN ID contains the access classification to which the packet belongs, the L3VSN data discloses the VRF to which the packet belongs, and the gateway MAC address tells the switches if a packet is addressed to that gateway MAC address then the switch should start routing the packet.

Figure 6:
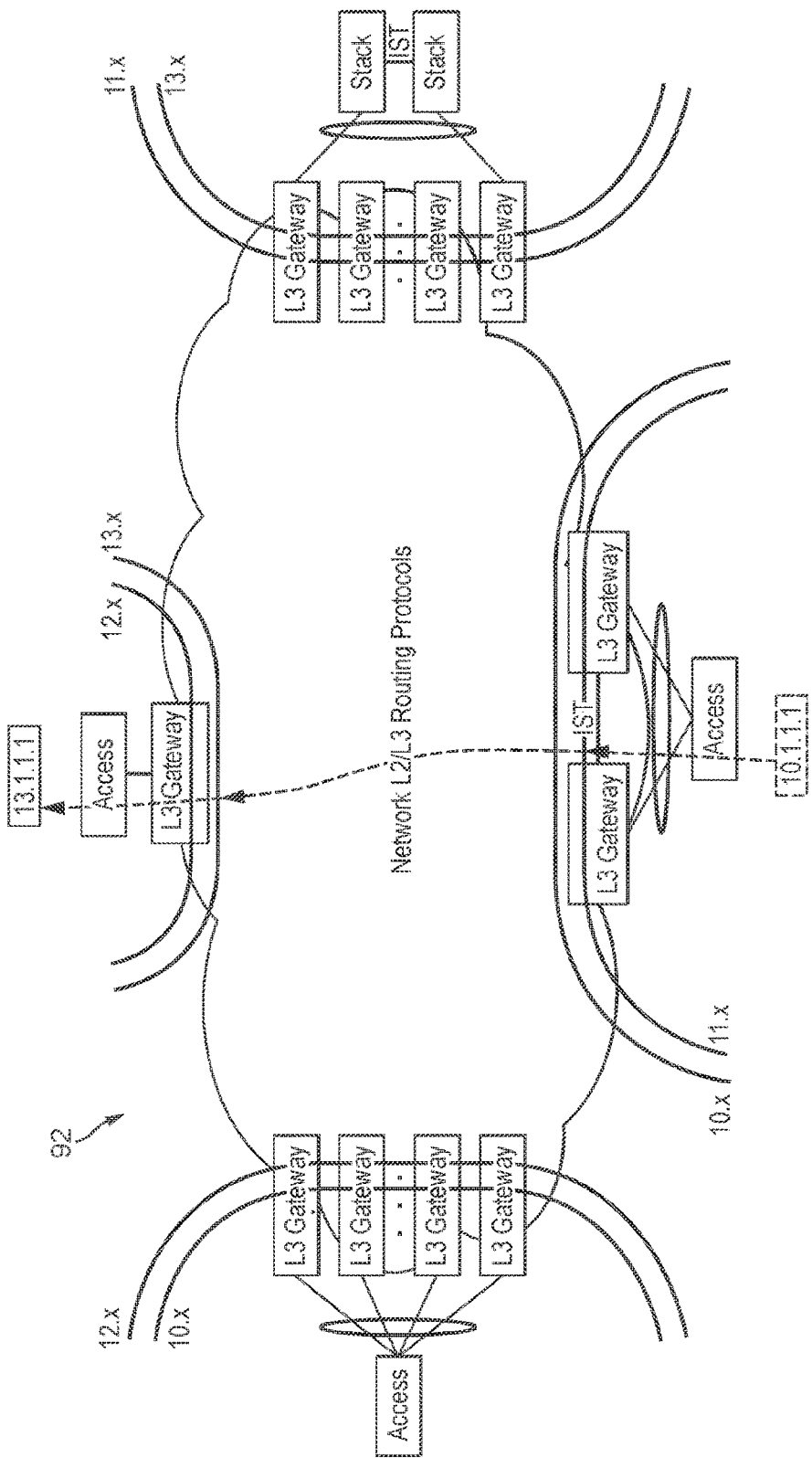
FIG. 6 depicts a network permitting single pass across the fabric in all cases.

What is desired, as shown in network environment 92 of FIG. 6, is a single pass across the core in all cases, no matter where the hosts are. Complete traffic patterns are achieved regardless whether the traffic is L2 or L3. The datapath and L3 forwarding tables should be distributed to maintain traffic efficiency.

Figure 7:
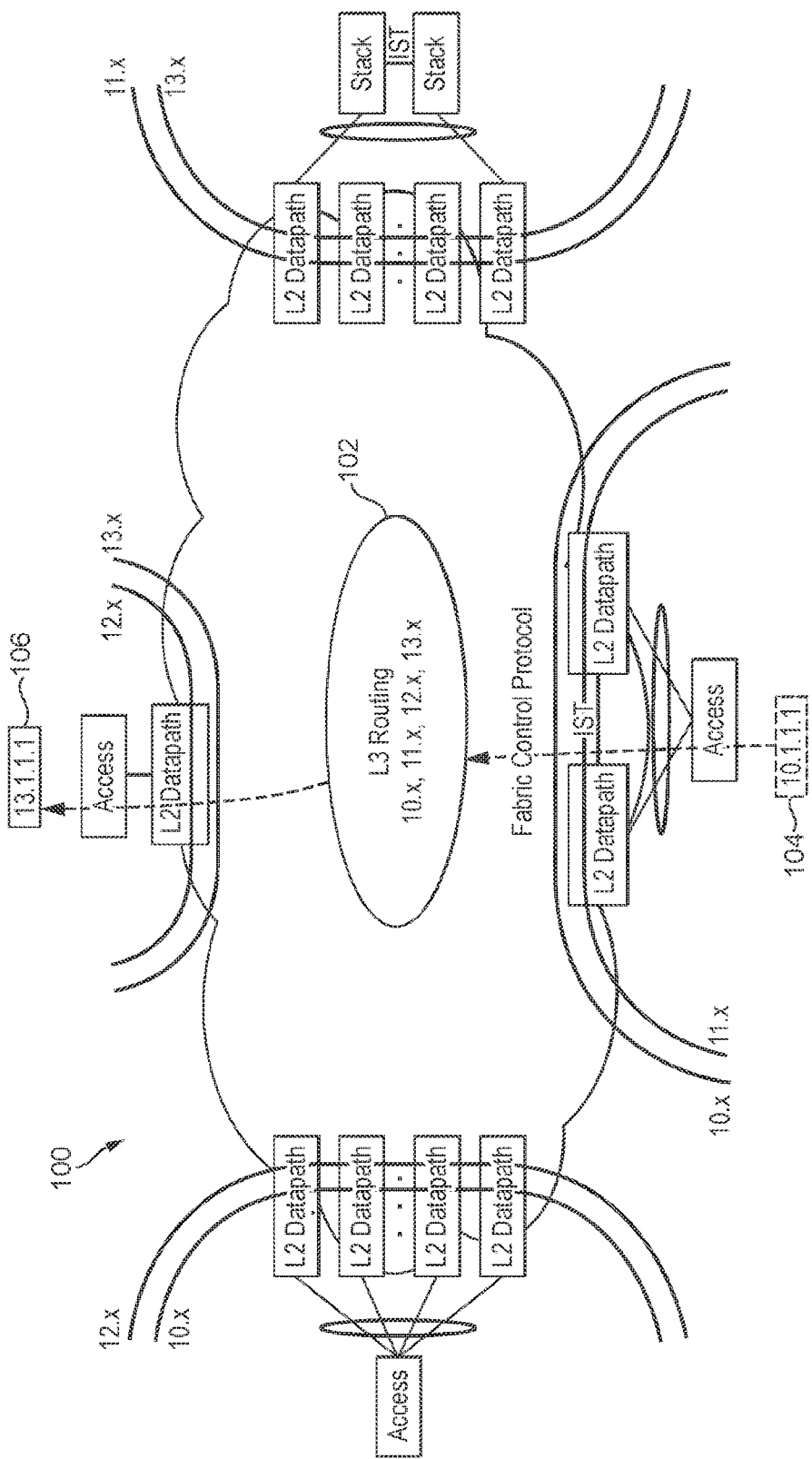
FIG. 7 depicts a network having an inter ISID routing view for simpler configuration.
Figure 8:
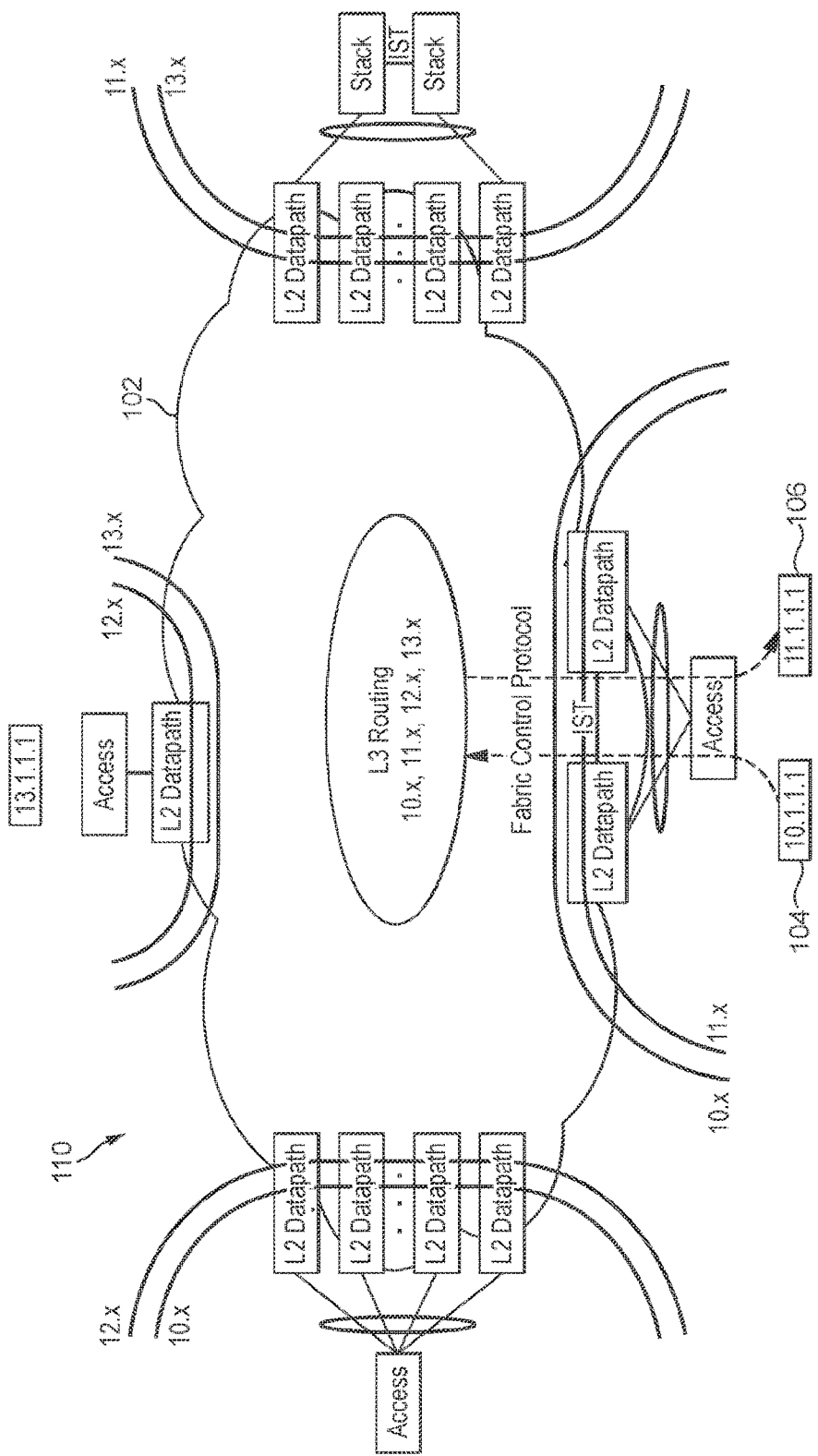
FIG. 8 depicts a network of FIG. 7 wherein all routed traffic becomes north-south traffic.

Referring now to FIG. 7, a network environment 100 is shown wherein the routing has been centralized by the addition of a L3 routing device 102 (also referred to as a L3 controller) within the core network. In this scenario, packets always get routed to the core, then routed out of the core. A problem with this, as shown in the network environment 110 of FIG. 8, is that local routed traffic still takes two hops. A packet sent from 10.1.1.1 to 11.1.1.1 still must traverse the core even though the two devices are local to each other.

Figure 9:
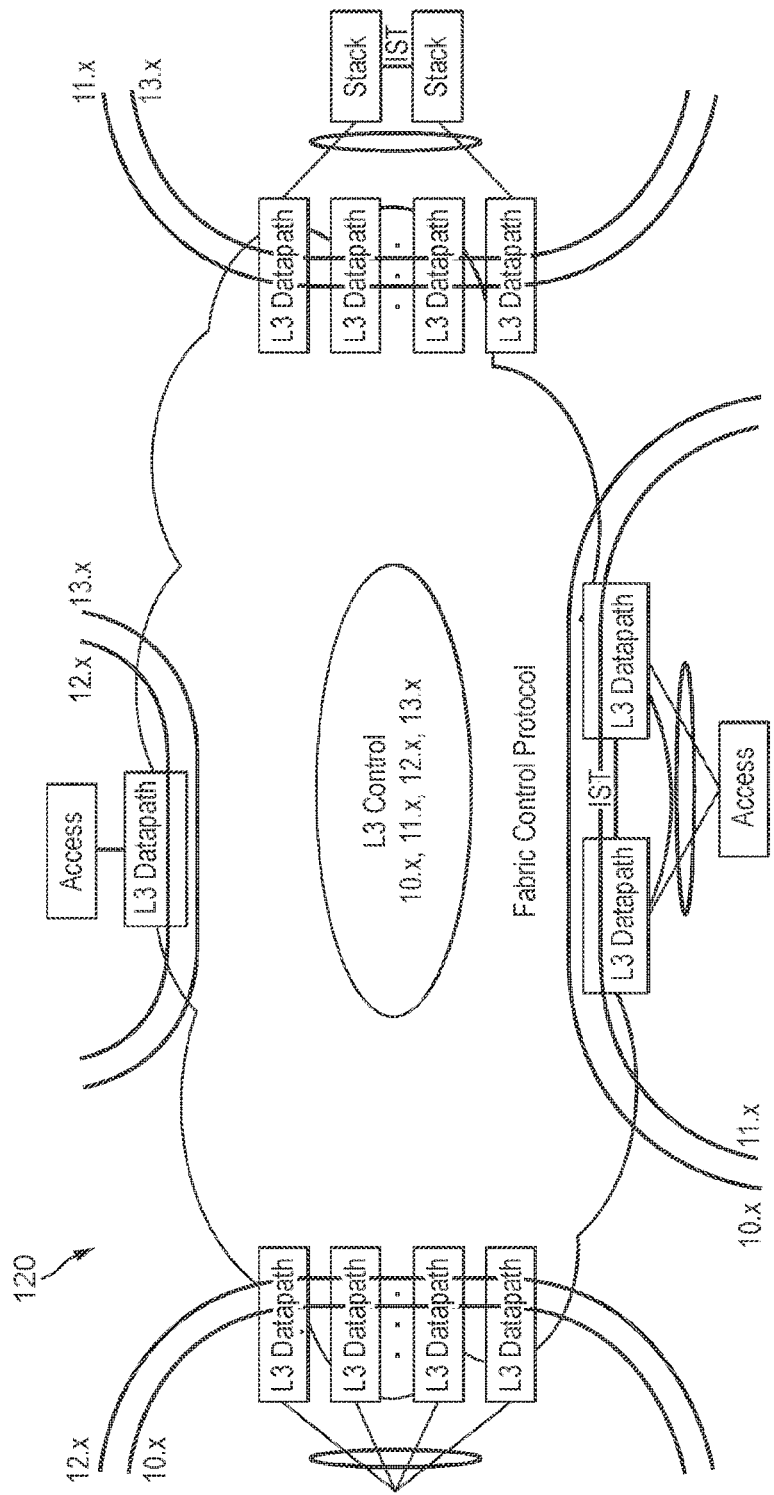
FIG. 9 depicts a network L3 view featuring centralized L3 control with a distributed datapath in accordance with embodiments of the invention.
Figure 10:
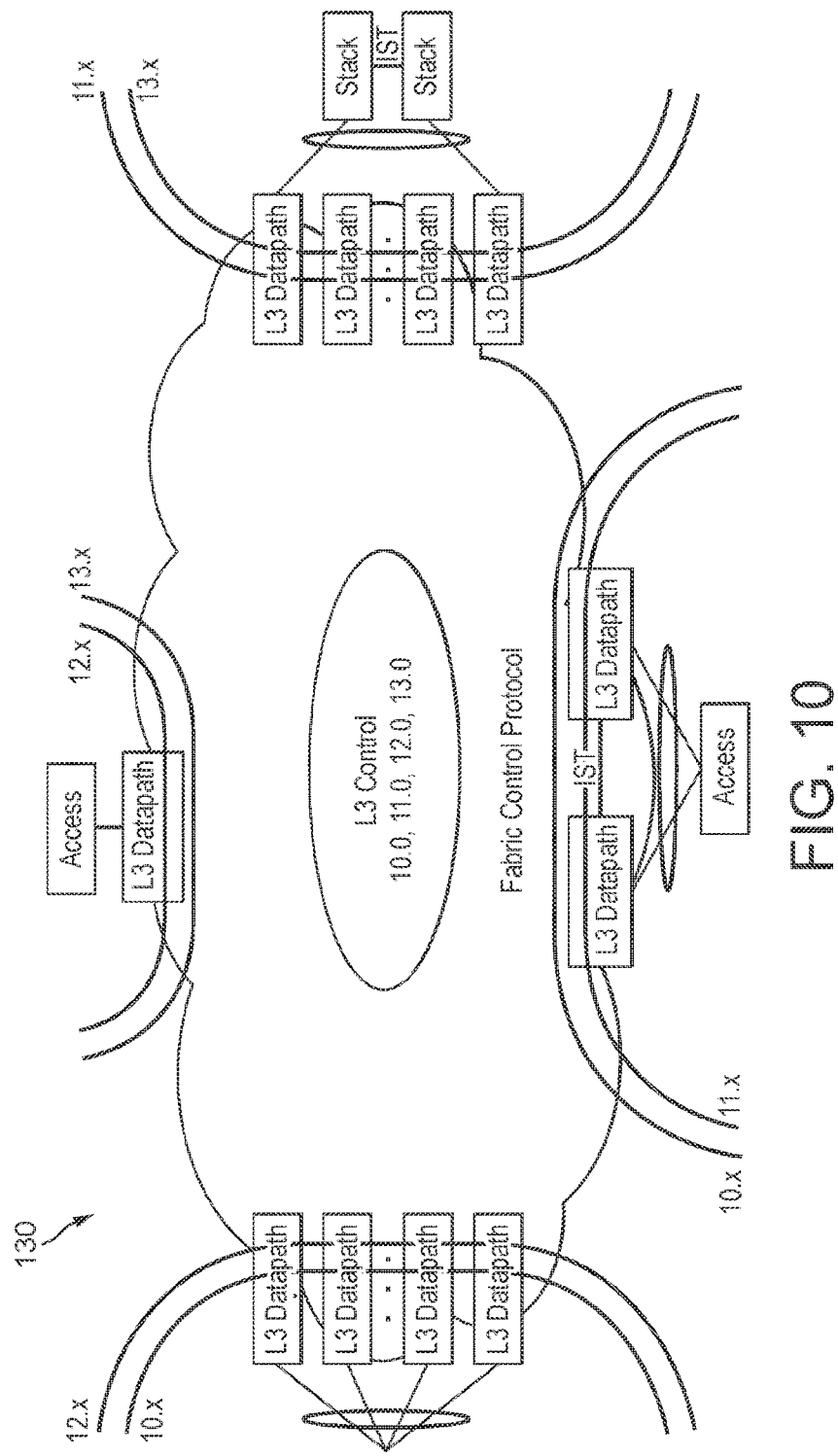
FIG. 10 depicts a network having a route table of network routes in accordance with embodiments of the invention.

FIG. 9 depicts a network environment 120 which shows how to keep control in the core, but with distributed datapath. As shown in FIG. 10, in network environment 130 all the subnet routes use the L3 controller as the next hop.

As described above, VRF and Gateway MAC address distribution is accomplished by way of the following steps. A subnet is created and associated with a L2VSN on a switch/router positioned as the L3-controller/SDN controller within the network. Optionally the L2VSN may also be associated with a VRF/L3VSN. The controller propagates a message containing a L2VSN ID, L3VSN ID, and a Gateway MAC Address to the distributed datapath. The switches in the distributed datapath that receive this message install this as a routable MAC address on the L2VSN for the L3VSN/VRF associated with the message. The Edge devices starts routing packets on the L2VSN addressed to the Gateway MAC address.

The host resolution happens because the network does not know when it starts routing where the specific host is located. The initial host resolution happens on a centralized controller. The default gateway functions will allow the packets to be forwarded to it and then the resolution of the gateway happens in the centralized controller.

Address Resolution Protocol (ARP) converts an Internet Protocol (IP) address to its corresponding physical network address. ARP is a low-level network protocol, operating at Layer 2 of the OSI model. Initially the L3 controller resolves ARPs when first routing the packet. A determination is made regarding which egress switch the host is directly connected to and distributes information about where the host is connected to other switches in the network. Following that, the other hosts in the network and the other switches start routing packets to the host when they see traffic addresses to that host.

The presently described dynamic host route distribution introduce a message that distributes the host ID, the host MAC address, the router MAC address, the destination VLAN to which the packet needs to be routed and the destination switch that the packet needs to be directed to. In an alternate embodiment, a simpler version of the message could be simply a host IP and a destination VRF. Additionally, an embodiment wherein a superset of the message is sent which contains more information to all the switches and the receiving switch decides to use all the information or part of the information.

As a host moves from one access point to another it sends out a gratuitous ARP which means the controller in the central of the network would detect that the host has moved and then update the table using the same message. The message is then re-published updating the location of the host taken.

Figure 11:
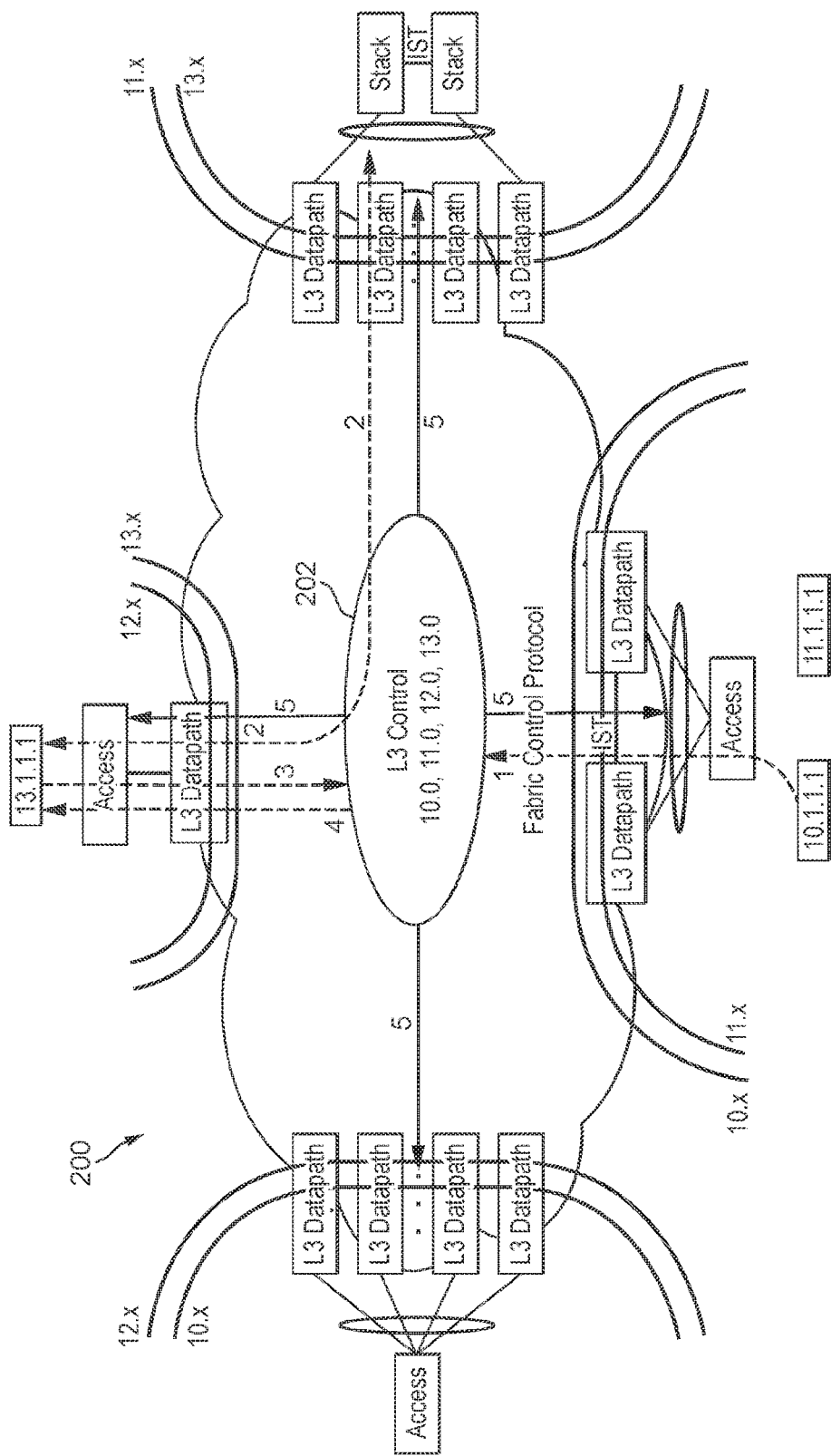
FIG. 11 depicts a network having centralized L3 control providing ARP resolution in accordance with embodiments of the invention.
Figure 12:
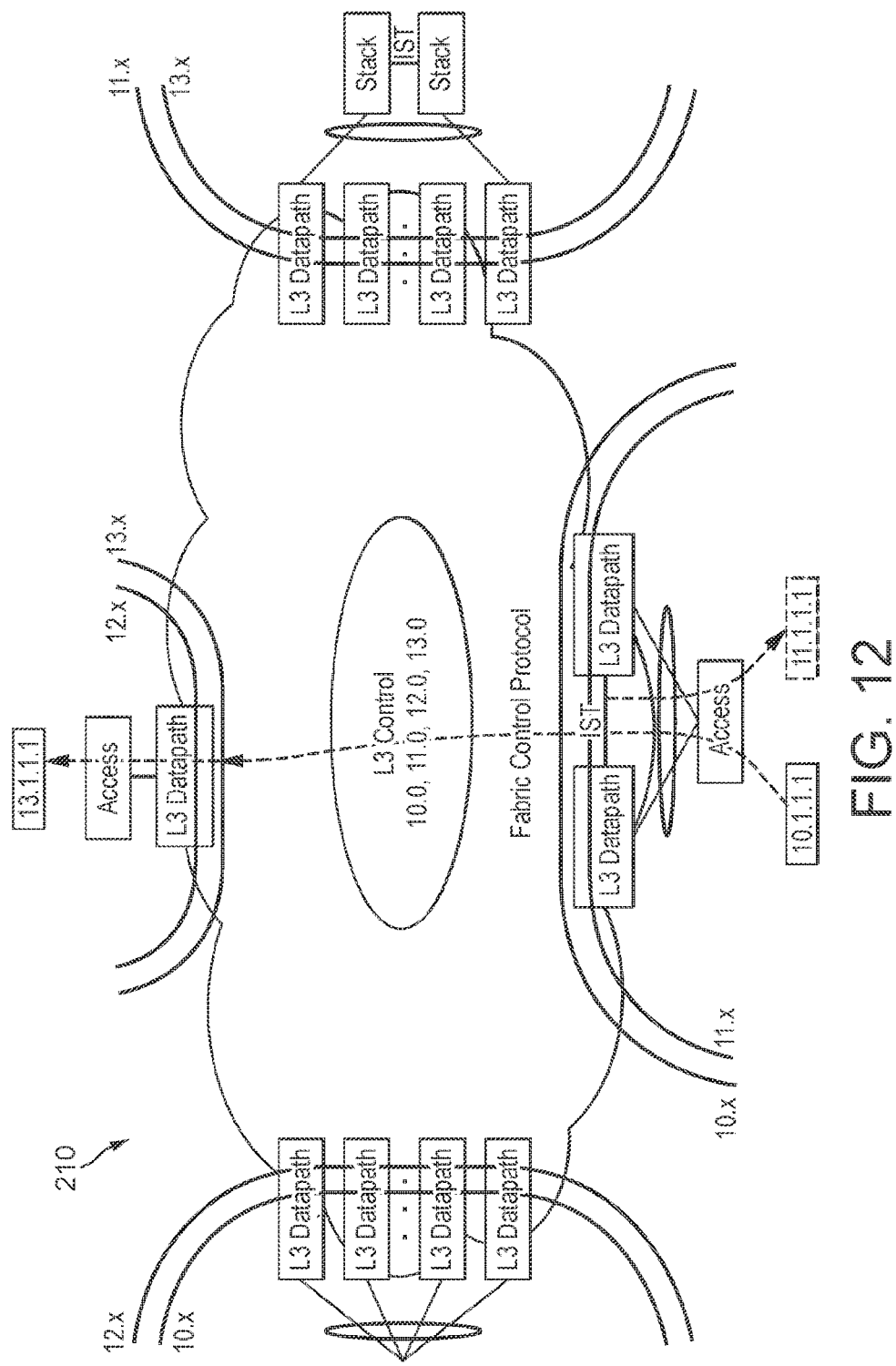
FIG. 12 depicts a network having a distributed datapath for host routes in accordance with embodiments of the invention.
Figure 13:
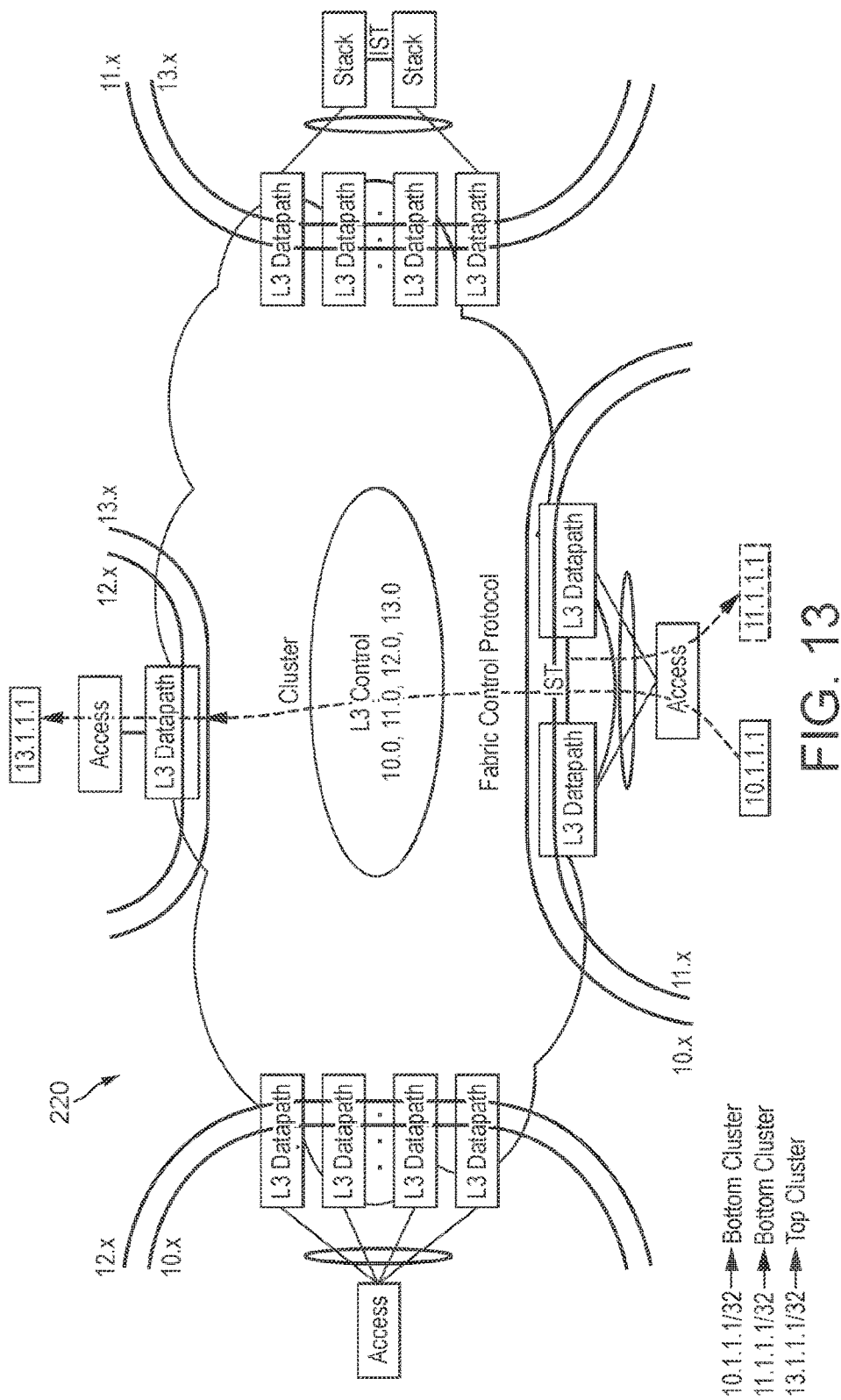
FIG. 13 depicts a network having host route distribution in accordance with embodiments of the invention.

Referring to FIG. 11, a network environment 200 is shown. A packet from 10.1.1.1 destined for 13.1.1.1 gets sent to the L3 controller 202 by way of longest prefix matching to 13.1.1.0/24 (path 1). The controller needs to resolve where the host is presently. L3 controller 202 sends an ARP request for 13.1.1.1 (path 2). An ARP response is sent from 13.1.1.1 to L3 controller 202 (path 3). The initial few packets get forwarded from L3 controller 202 to 13.1.1.1 (path 4). After that, the controller pushes the location of the host 13.1.1.1/32 down towards the datapath layer for 10.1.1.1. The distributed datapath installs a host route for 13.1.1.1/32. Afterwards, any packets destined to 13.1.1.1 go directly to 13.1.1.1, as all subsequent routing takes place on the edge of the network, as shown in network environment 210 of FIG. 12 and network environment 220 on FIG. 13.

As also described above, the present invention provides Dynamic Host Route Distribution by performing the following steps. A switch/router positioned as a L3 controller resolves the ARP for a host on a subnet associated with one of its L2VSNs when it tries to route a packet to the host. The L3 controller distributes this information to the distributed datapath. Two possible information models are proposed for such a message. The message contains a Host IP, Host MAC Address, Router MAC Address, Destination L2VSN, and Destination BEB which allows the Egress BEB to act as a simple L2VSN device or the message contains a Host IP and Destination BEB which would require the Egress BEB to do a Route Lookup. When the host moves from one access point to another, it sends out a Gratuitous ARP. The L3 controller, in its normal processing model, would update the ARP record associated with the host. As part of this invention, it would additionally push out the updated ARP/host route information to the distributed datapath.

Further embodiments could include selectively apply the proposed mechanisms to a subset of the subnets. The controller could be implemented on a server with a software datapath, but plugged into a Network-to Network Interface (NNI) in a shortest Bridging Path (SPB) network. Implementations could also include the use of redundant controllers. A further implementation would use application controllers for L4-L7 services to achieve single fabric-pass application level traffic flows.

Figure 14:
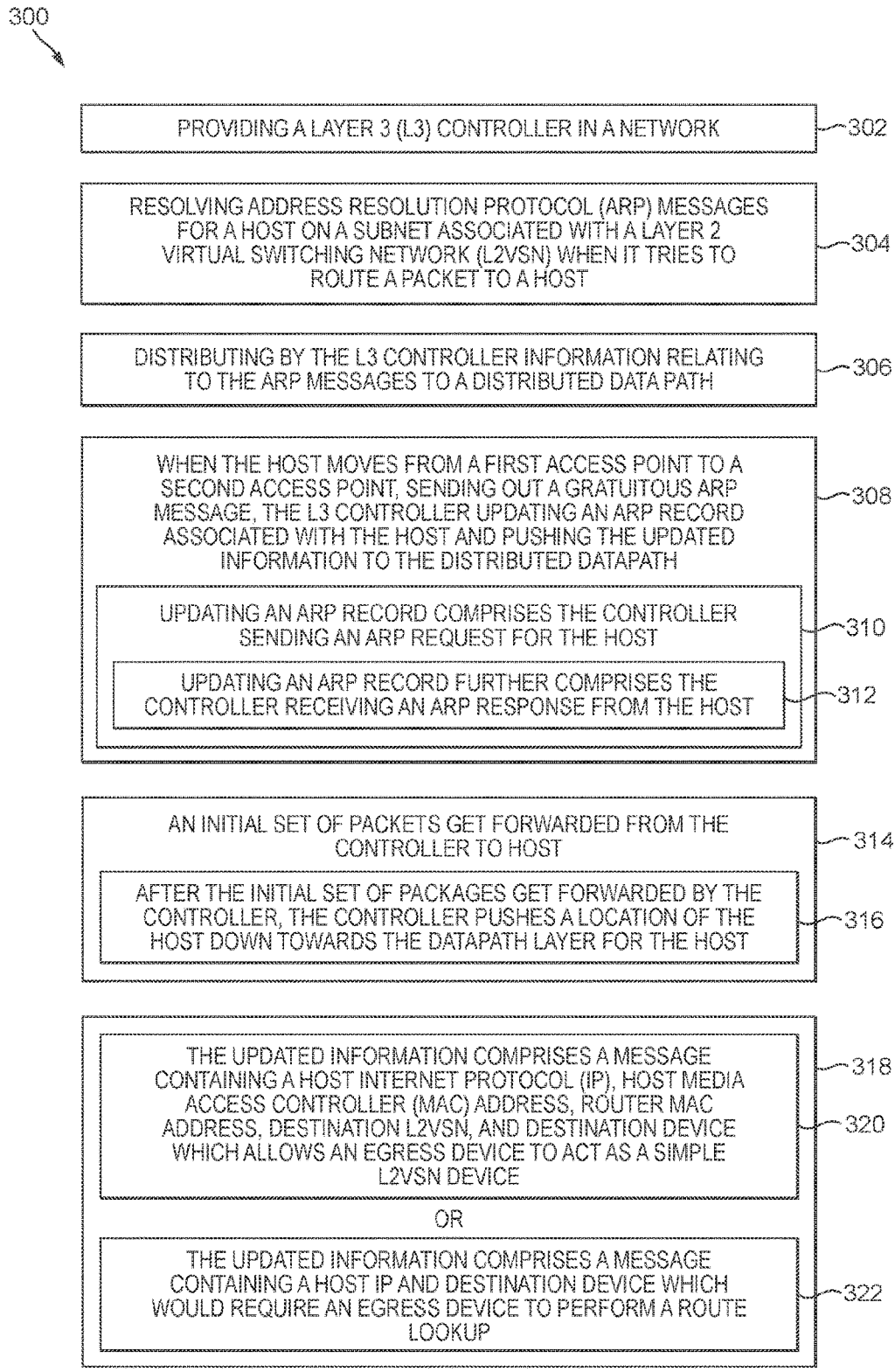
FIG. 14 discloses a flow diagram of a particular embodiment of a method for providing single-tier routing in a network.

A flow chart of the presently disclosed method is depicted in FIG. 14. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 14, a particular embodiment of a method for providing single tier routing in a network is shown. Method 300 begins with processing block 302 which discloses providing at least one subnet associated with a Layer 2 Virtual Switching Network (L2VSN) on a network device. A subnet is a logical grouping of connected network devices. Nodes on a subnet tend to be located in close physical proximity to each other on a Local Area Network (LAN). As shown in processing block 304, the network device is positioned as an L3 controller. In a particular embodiment, as shown in processing block 306, the controller is implemented on a server with a software Datapath, and plugged into a Network-to-Network Interface (NNI) in a Shortest Path Bridging (SPB) network. In yet another embodiment, as recited by processing block 308, the controller is one of at least two redundant controllers. This is done to provide a measure of improved reliability. As shown in processing block 310, the L2VSN is associated with a VRF/L3VSN.

Processing continues with processing block 312 which states propagating a message to a distributed datapath. As shown in processing block 314, the message includes a L2VSN identifier (ID), a L3VSN ID and a MAC address. In a certain embodiment, the propagating a message is only applied to predetermined subnets of a plurality of subnets, as recited by processing block 316.

Processing block 318 discloses installing, by devices in the distributed Datapath, the message as a routable MAC address on the L2VSN for the Layer 3 Virtual Switching Network/Virtual Routing and Forwarding (L3VSN/VRF) associated with the message.

Processing block 320 states routing, by edge devices, packets on the L2VSN addressed to the gateway MAC address. As shown on processing block 322, in a particular embodiment application controllers can be used for Layer 4 (L4) through Layer 7 (L7) services to achieve single fabric-pass application level traffic flows.

Figure 15:
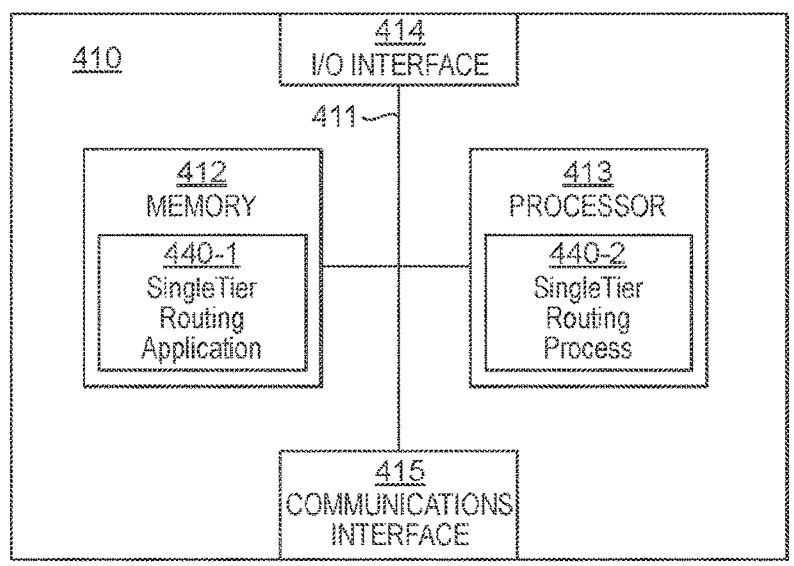
FIG. 15 illustrates an example computer system architecture for a computer system that performs single tier routing in a network in accordance with embodiments of the invention.

FIG. 15 is a block diagram illustrating example architecture of a computer system 410 that executes, runs, interprets, operates or otherwise performs a single tier routing operating application 440-1 and single tier routing operating process 440-2 suitable for use in explaining example configurations disclosed herein. The computer system 410 may be any type of computerized device such as a network switch, router or controller or the like. As shown in this example, the computer system 410 includes an interconnection mechanism 411 such as a data bus or other circuitry that couples a memory system 412, a processor 413, an input/output interface 414, and a communications interface 415. The communications interface 415 enables the computer system 410 to communicate with other devices (i.e., other computers) on a network (not shown).

The memory system 412 is any type of computer readable medium, and in this example, is encoded with a single tier routing operating application 440-1 as explained herein. The single tier routing operating application 440-1 may be embodied as software code such as data and/or logic instructions (e.g., code stored in the memory or on another computer readable medium such as a removable disk) that supports processing functionality according to different embodiments described herein. During operation of the computer system 410, the processor 413 accesses the memory system 412 via the interconnect 411 in order to launch, run, execute, interpret or otherwise perform the logic instructions of a single tier routing operating application 440-1. Execution of a single tier routing operating application 440-1 in this manner produces processing functionality in the single tier routing operating process 440-2. In other words, the single tier routing operating process 440-2 represents one or more portions or runtime instances of a single tier routing operating application 440-1 (or the entire a single tier routing operating application 440-1) performing or executing within or upon the processor 413 in the computerized device 410 at runtime.

It is noted that example configurations disclosed herein include the single tier routing operating application 440-1 itself (i.e., in the form of un-executed or non-performing logic instructions and/or data). The single tier routing operating application 440-1 may be stored on a computer readable medium (such as a floppy disk), hard disk, electronic, magnetic, optical, or other computer readable medium. A single tier routing operating application 440-1 may also be stored in a memory system 412 such as in firmware, read only memory (ROM), or, as in this example, as executable code in, for example, Random Access Memory (RAM). In addition to these embodiments, it should also be noted that other embodiments herein include the execution of a single tier routing operating application 440-1 in the processor 413 as the single tier routing operating process 440-2. Those skilled in the art will understand that the computer system 410 may include other processes and/or software and hardware components, such as an operating system not shown in this example.

During operation, processor 413 of computer system 400 accesses memory system 412 via the interconnect 411 in order to launch, run, execute, interpret or otherwise perform the logic instructions of single tier routing application 440-1. Execution of persistent security application 440-1 produces processing functionality in persistent security process 440-2. In other words, single tier routing process 440-2 represents one or more portions of single tier routing application 440-1 (or the entire application) performing within or upon the processor 413 in the computer system 400.

It should be noted that, in addition to single tier routing process 440-2, embodiments herein include single tier routing application 440-1 itself (i.e., the un-executed or non-performing logic instructions and/or data). Single tier routing application 440-1 can be stored on a computer readable medium such as a floppy disk, hard disk, or optical medium. Single tier routing application 440-1 can also be stored in a memory type system such as in firmware, read only memory (ROM), or, as in this example, as executable code within the memory system 412 (e.g., within Random Access Memory or RAM).

In addition to these embodiments, it should also be noted that other embodiments herein include the execution of single tier routing application 440-1 in processor 413 as single tier routing process 440-2. Those skilled in the art will understand that the computer system 400 can include other processes and/or software and hardware components, such as an operating system that controls allocation and use of hardware resources associated with the computer system 400.

In view of the above, the present invention provides path selection decisions that are internal to the fabric are under the controller of the fabric. This allows for faster convergence and a simpler operational model compared to a model where an external controller is making decisions on how core-network paths are exercised. The present invention also provides optimized multicast and lower encapsulation overhead compared to an overlay model. By way of the present invention core forwarding tables are normalized to a MAC table. This scales much better than a TCAM based core forwarding action on individual flows. The present invention also achieves a separation of a significant chunk of the L3 controller plane from the hardware that forwards the packets. This allows for a lot of flexibility regarding where the controllers are placed, controller plane scaling and redundancy models.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method for providing Virtual Routing and Forwarding (VRF) and gateway Media Access Controller (MAC) distribution in a network, the method comprising:
  implementing, by a computer, a Layer 3 (L3) controller for the network;
  resolving, by the implemented L3 controller, a first Address Resolution Protocol (ARP) message for a host on a subnet associated with a Layer 2 Virtual Switching Network (L2VSN) when routing a packet to the host connected to a first access point of the network;
  distributing, by the implemented L3 controller, information relating to the first ARP message to a distributed datapath of the network;
  receiving, by the implemented L3 controller, a gratuitous ARP message from the host when the host moves from the first access point to a second access point of the network;
  based on the gratuitous ARP message, detecting, by the implemented L3 controller, that the host is attached to the second access point on the network; and
  distributing, by the implemented L3 controller, a message to the distributed datapath,
    wherein the distributed message comprises data indicating the host is attached to the second access point of the network.

2. The method of claim 1, further comprising:
based on the gratuitous ARP message, updating, by the implemented L3 controller, an ARP record associated with the host.

3. The method of claim 2, wherein updating the ARP record comprises:
sending, by the implemented L3 controller, an ARP request message to the host.

4. The method of claim 3, wherein updating the ARP record comprises:
receiving, by the implemented L3 controller, an ARP response message from the host.

5. The method of claim 1, further comprising:
forwarding, by the implemented L3 controller, an initial set of packets to the host,
wherein distributing the information related to the first ARP message occurs after forwarding the initial set of packets.

6. The method of claim 1, wherein the distributed datapath comprises one or more edge switches.

7. The method of claim 6, wherein the distributed information relating to the first ARP message comprises an Internet Protocol (IP) address of the host, a MAC address of the host, a MAC address of a router, a destination L2VSN, and a destination edge switch.

8. The method of claim 1, wherein the L2VSN is associated with a Layer 3 Virtual Switching Network (L3VSN).

9. A system for providing Virtual Routing and Forwarding (VRF) and gateway Media Access Controller (MAC) distribution in a network, the system comprising:
a computer readable storage medium, storing executable instructions; and
a processor in communication with the computer readable storage medium, the processor when executing the executable instructions:
implements a Layer 3 (L3) controller for the network;
resolves a first Address Resolution Protocol (ARP) message for a host on a subnet associated with a Layer 2 Virtual Switching Network (L2VSN) when routing a packet to the host connected to a first access point of the network;
distributes information relating to the first ARP message to a distributed datapath of the network;
receives a gratuitous ARP message from the host when the host moves from the first access point to a second access point of the network;
based on the gratuitous ARP message, detects that the host is attached to the second access point on the network; and
distributes a message to the distributed datapath,
wherein the distributed message comprises data indicating the host is attached to the second access point of the network.

10. The system of claim 9, wherein the processor when executing the executable instructions, based on the gratuitous ARP message:
updates an ARP record associated with the host.

11. The system of claim 10, wherein the processor when executing the executable instructions:
sends an ARP request message to the host.

12. The system of claim 11, wherein the processor when executing the executable instructions:
receives an ARP response message from the host.

13. The system of claim 9, wherein the processor when executing the executable instructions:
forwards an initial set of packets to the host,
wherein distributing the information related to the first ARP message occurs after forwarding the initial set of packets.

14. The system of claim 9, wherein the distributed datapath comprises one or more edge switches.

15. The system of claim 14, wherein the distributed information relating to the first ARP message comprises an Internet Protocol (IP) address of the host, a MAC address of the host, a MAC address of a router, a destination L2VSN, and a destination edge switch.

16. The system of claim 9, wherein the L2VSN is associated with a Layer 3 Virtual Switching Network (L3VSN).

* * * * *